United States Patent [19]

Lagares Corominas

[11] Patent Number: 5,374,437
[45] Date of Patent: Dec. 20, 1994

[54] PASTEURIZATION, STERILIZATION AND ASEPTIC PACKING METHOD FOR MEAT PRODUCTS

[75] Inventor: Narciso Lagares Corominas, Girona, Spain

[73] Assignee: Metalquimia S.A., Girona, Spain

[21] Appl. No.: 145,513

[22] Filed: Nov. 4, 1993

Related U.S. Application Data

[62] Division of Ser. No. 858,007, Mar. 29, 1992, Pat. No. 5,269,216.

[30] Foreign Application Priority Data

Mar. 28, 1991 [FR] France ................... 91 04073
Mar. 25, 1992 [ES] Spain ................... 9200642

[51] Int. Cl.⁵ .................. A23B 4/005; B65D 55/00
[52] U.S. Cl. ................... 426/392; 426/399; 426/407; 426/412; 426/413; 99/352; 99/355; 99/356; 99/467; 99/472
[58] Field of Search ........... 99/352, 355, 356, 451, 99/483, 484, 516, 534, 535, 467–472; 452/134, 135, 198; 53/425, 450, 510, 512, 517, 127, 79; 426/392, 399, 403, 407, 412, 413, 414; 141/59, 65

[56] References Cited

U.S. PATENT DOCUMENTS

| | | | |
|---|---|---|---|
| Re. 31,513 | 1/1984 | Glen | 99/470 |
| Re. 32,695 | 6/1988 | Nahra et al. | 99/467 |
| 3,603,240 | 9/1971 | McCarthy | 99/356 |
| 3,661,073 | 5/1972 | Schack et al. | 99/533 |
| 3,793,939 | 2/1974 | Wieser et al. | 99/484 |
| 3,809,844 | 5/1974 | Stenstrom | 99/451 |
| 3,874,145 | 4/1975 | Schmidt | 53/510 |
| 4,296,588 | 10/1981 | Vetter | 53/510 |
| 4,885,897 | 12/1989 | Gryouda et al. | 53/432 |
| 4,948,610 | 8/1990 | Goglio | 426/392 |
| 4,968,516 | 11/1990 | Thompson et al. | 99/330 |
| 5,048,404 | 9/1991 | Bushnell et al. | 99/483 |

FOREIGN PATENT DOCUMENTS 2508279 12/1982 European Pat. Off. .
0128610 12/1984 European Pat. Off. .
0230978 8/1987 European Pat. Off. .

Primary Examiner—Donald E. Czaja
Assistant Examiner—Milton I. Cano
Attorney, Agent, or Firm—Jacobson, Price, Holman & Stern

[57] ABSTRACT

A method for sterilizing, packing and sealing a meat product includes at first station (1) sterilizing the meat product surface layer or stratum by submitting it to a thermal shock of high temperature during a very short interval (HTST technique), feeding the meat products to the first station and withdrawing the meat product from the first station and transferring it to a second station (2), wrapping the meat product at the second station in a pre-set position including for sequentially positioning (57, 58) tubular container such as bags (65) from a storage area (62) therefor to the wrapping position and opening the inlet of the tubular container for insertion of the meat product therein from the transfer device (0), transferring (85, 86, 87, 88, 95) the filled tubular containers in the open position to a third station (3), and vacuum sealing the containers at the third station. A cover (46) is provided in the first station for assuring aseptic atmosphere for the sterilization at an average temperature from 100° C. to 160° C. at intervals less than 15 seconds. An enclosure (120) is provided for enclosing the three stations in a laminar upright flow chamber to assure the purity of the atmosphere in which the sterilization is carried out.

10 Claims, 15 Drawing Sheets

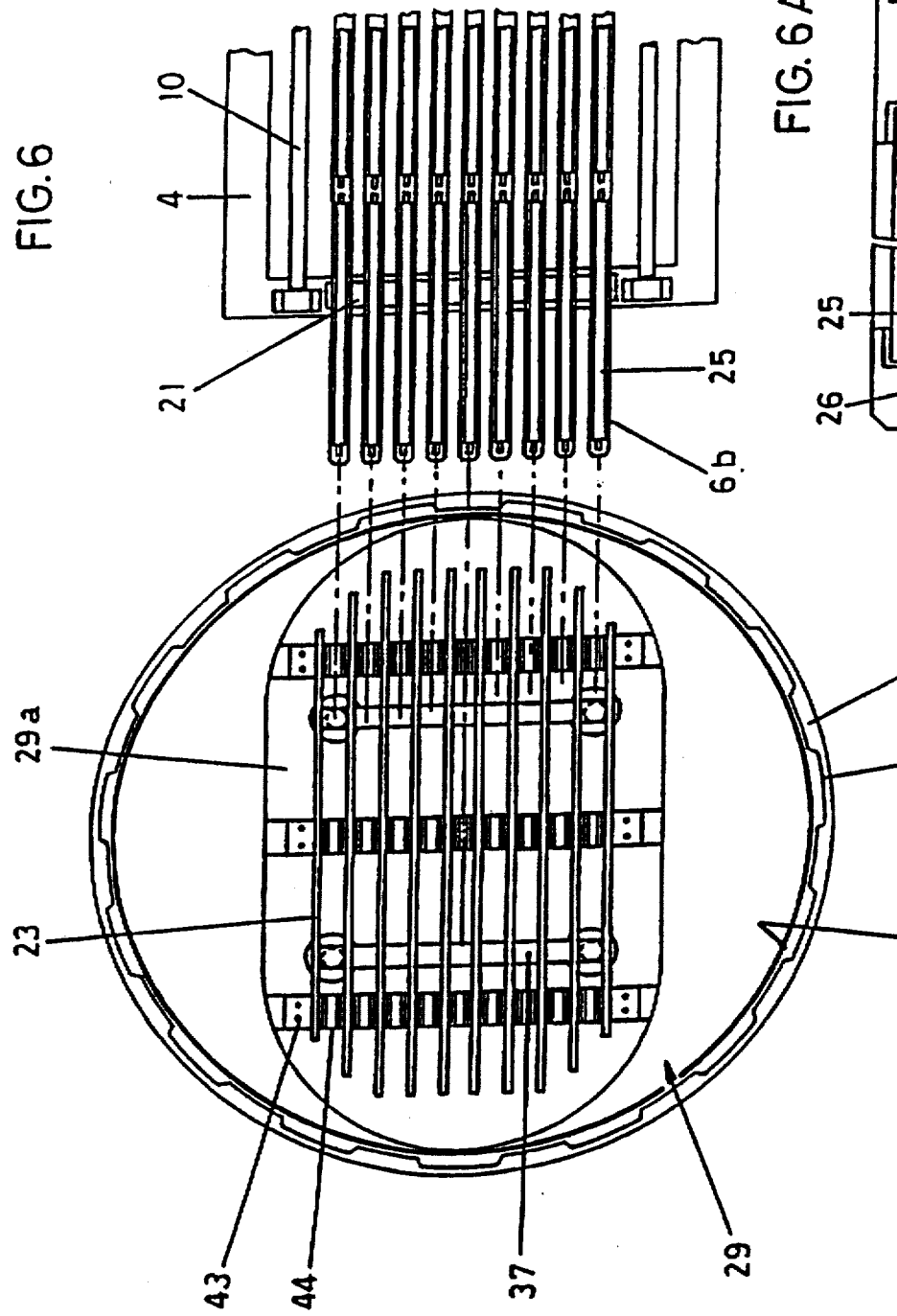
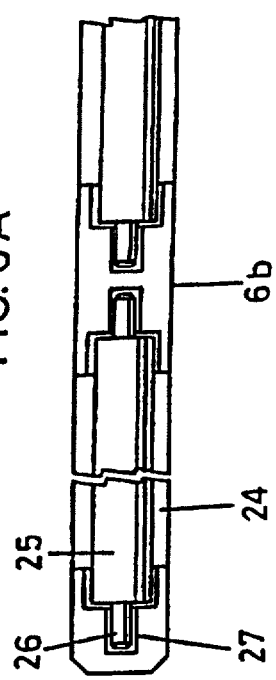

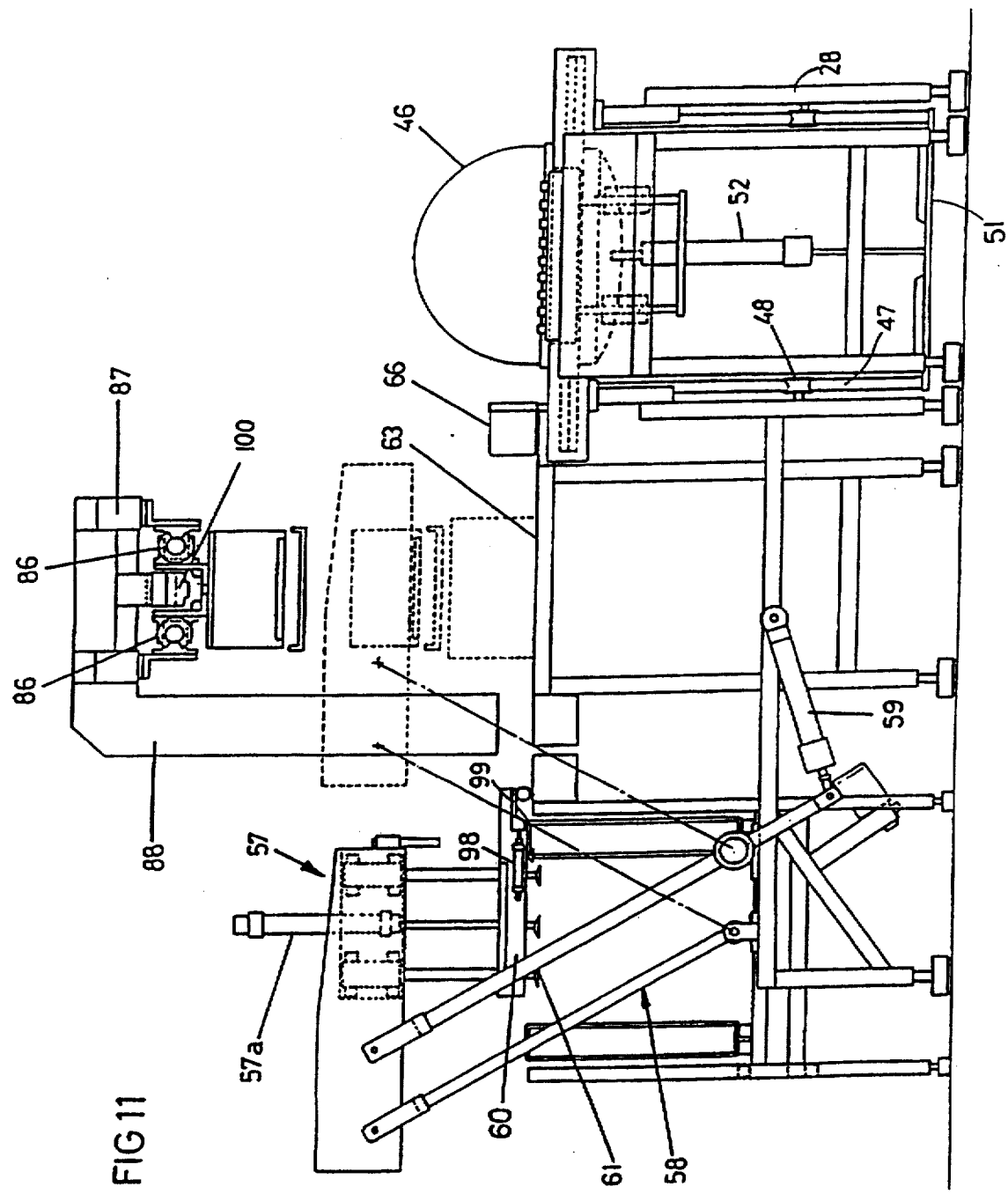

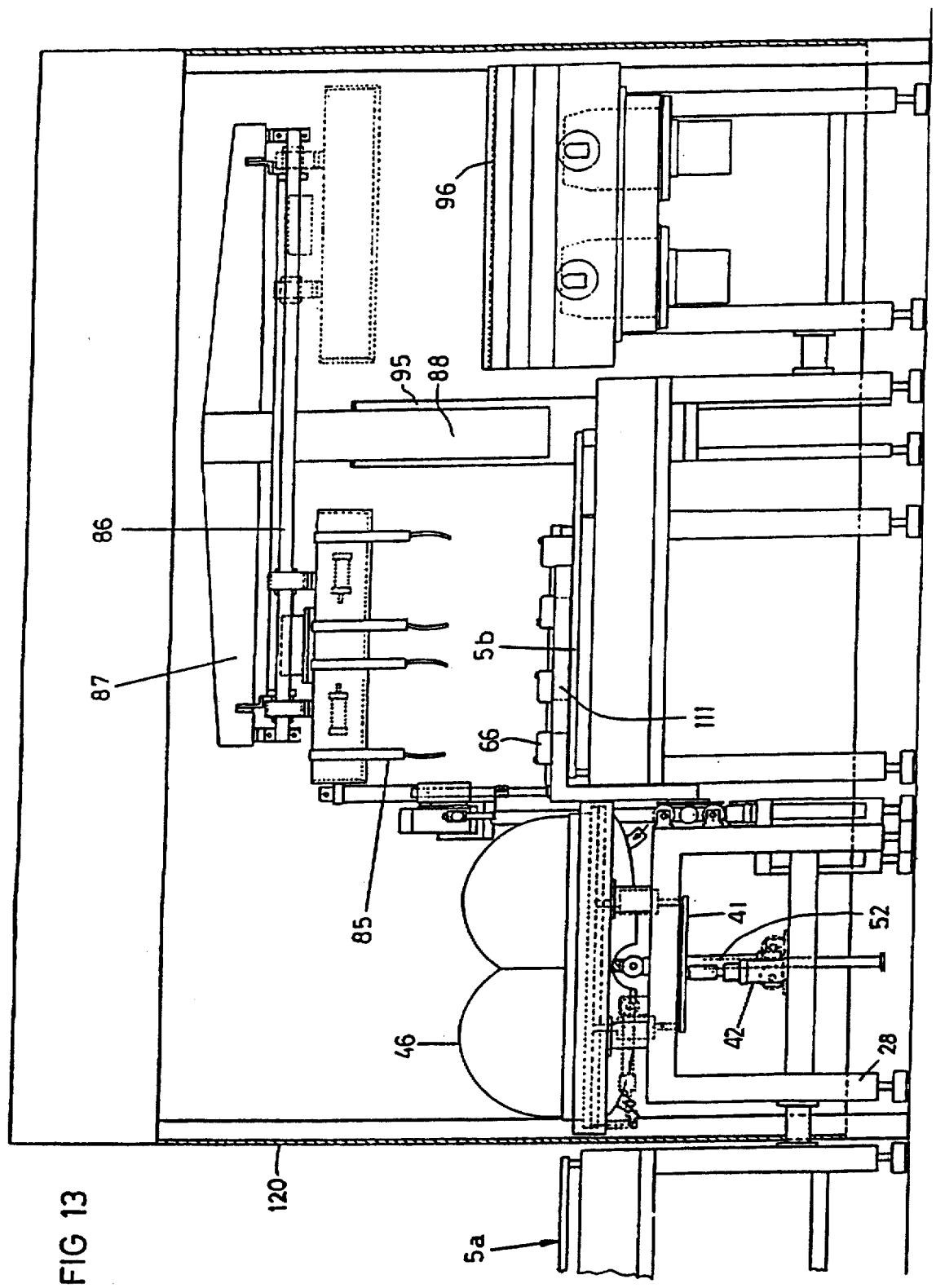

PASTEURIZATION, STERILIZATION AND ASEPTIC PACKING METHOD FOR MEAT PRODUCTS

This is a divisional of application Ser. No. 07/858,007 filed Mar. 29, 1992 now U.S. Pat. No. 5,269,216.

BACKGROUND OF THE INVENTION

This invention relates to a process for processing perishable meat products, such as a piece of ham or shoulder meat, which having sustained deboning, additives and/or ingredients injecting (auxiliary to namely coloration and taste), tenderizing, massing and curing operations, is later on submitted to a cooking-pasteurization stage, inside a rigid or semi-rigid mold protected by a continuous (open bag) wrapping, at room temperature or in vacuum, after which stage it is demolded and taken apart from that wrapping to eliminate fluids exuded during the cooking-pasteurization process and for a suitable conditioning of the product surface, being finally repacked, advantageously in vacuum in tightly sealed conditions by means of different sealing means (stapling, heat-sealing etc.).

The above procedure is mainly used to obtain high quality products, in which an exudation during the cooking-pasteurization stage is sought, in order to achieve a best development of flavor and aroma. The fact that it is not necessary to prevent the juice exudation during the cooking-pasteurization, also means a lesser mechanical treatment of the meat piece during the process, which will allow to obtain a product with a best appearance, similar to the one obtained through craftsmanship.

On the other hand eliminating the juices is essential, mainly for suitable preservation of the packed product.

Bearing in mind that after meat product cooking-pasteurization and when opening the wrapping (bag), unavoidable product surface recontamination arises, after the final repacking a pasteurization or sterilization stage is required for correct preservation of the product. In this point, the further product heating once its final packing is achieved, was up to now the most used method to significantly extend the preservation of the cooked-pasteurized products, without requiring to have recourse to other treatments, such as chemical or radiations after final packing.

For such purpose, up to this time, several equipments were developed which generally include a great volume and high cost, with dilated operative times.

We can mention, namely, the use of autoclaves of nonstop operation. One equipment existing in the market includes three columns arranged one after the other for the heating-sterilization-cooling stages. The molds are automatically entered inside containing devices which passes conveyed by conveying means through said columns, the sterilizing medium being a vapor and air mixture, depending on the case.

Another autoclave of the above type includes a horizontally positioned boiler in which the containers enter through a conveying chain and a gate, either or not submitted to a rotary movement, to be pre-heated, sterilized and pre-cooled. Later on, and already outside the boiler, they finish their cooling without pressure. The sterilizing medium is water or a vapor and air mixture.

An alternative equipment includes an oven in which the products are introduced and which, after a certain period of time of heat contribution and further cooling, is unloaded. This process makes continuous work difficult, as it demands loading and unloading operations of the working premise.

As can be seen, the above processes all require in addition to a long heating time, necessarily a significant cooling time.

On the other hand, the sterilization or pasteurization stage, in addition to the above drawbacks, and mainly due to the long time of process with heat contribution, produces in a number of cases an impairment of the meat piece surface color by degrading the meat pigment, modifying therefore the appearance of the end product obtained.

BRIEF SUMMARY OF THE INVENTORY

An object of the invention is to provide a process which produces a significant decrease of the process time with respect to the state of the art disclosed, and a guaranty of a long packed product (meat piece) preservation time, due to an effective elimination of the microbial flora from the product recontaminated area, once the post-cooking pasteurization stage to eliminate exudate and condition the surface of said meat piece is ended, with an utmost preservation of the organoleptic properties of the product involved.

The operative conditions of the procedure disclosed allows in addition that the plant has a smaller and less complex volume, and makes possible a nonstop treatment which encompasses the product sterilization and final packing under aseptic conditions.

The invention is based applying a HTST (high temperature short time) sterilization technique, i.e. it consists in producing a high temperature thermal shock (of at least 100-160 degrees C.), of a very short duration, to which the whole product surface is submitted after the re-conditioning stage (meat piece exudate elimination and surface conditioning) after the post-cooking-pasteurization stage, and which is followed by a final vacuum or (controlled) modified atmosphere packing, in aseptic conditions, all being achieved in a nonstop process.

The heat exchange process associated with the HTST sterilization technique because of the nature of the equipment used was only applied up to now to liquids or to liquids which contained small particles. When the size of the particles is over a few mm the effectiveness of the sterilization method is lost as the particle thermal center is not reached, in addition to requiring complicated product conveying means through the treatment area.

However, in accordance with the process of this invention, the HTST technique, has been found applicable and effective for meat pieces. Submitting them previously to a cooking-pasteurizing i.e. it can be used in the mentioned re-packing stage, preceding the properly called packing which would be achieved later on in aseptic conditions, because in the mentioned prior re-conditioning stage (meat piece exudate elimination and surface conditioning), only a superficial contamination will occur, i.e. limited to the stratum immediately close to the external face of the meat piece. This way, a HTST technique treatment, is useful and feasible, as it fully affects the product external layer, achieving, in addition a much more effective result as for microorganisms impairment and/or growth inhibition thereof, than the one resulting from applying the traditional heat contribution techniques with the meat piece located inside a tightly closed packing, obtaining a self-stable product fit for a longer duration preservation than that provided by traditional techniques and procedures and with a minimum organoleptic degradation.

In addition, as the high temperature thermal treatment, according to the HTST technique, only affects the meat piece surface layer or stratum, cooling the piece will occur faster, allowing the machine to operate in a nonstop manner to the product final packing, in aseptic conditions.

Therefore, the procedure disclosed consists basically in the following steps:

a) meat piece pasteurization by cooking inside rigid or semi rigid molds or containers, advantageously protected by a wrapping means, open or closed, until it reaches a temperature in the thermal center of the meat piece of 65 to 75 Degrees C., and during an interval of time sufficient for a suitable pasteurization of the product which guaranties heating effects (value F 10°-70° C.) over 30 measured at the piece thermal center;

b) withdrawal of the pasteurization meat piece from its wrapping means, exuded fluids elimination and product external surface conditioning;

c) sterilization of the meat piece surface layer or stratum, submitting it to a thermal shock of high temperature during a very short interval, in accordance with a HTST technique (high temperature short time) operating in room temperature conditions directly at contact with the meat piece surface over 100° C. and the time of treatment by piece being under 15 second;

d) product re-packing in aseptic conditions, c) and d) being carried out by automatic equipment nonstop, without organoleptic and nutritious conditions impairment.

The machine for performing operations; c) and d) above according to the invention includes:

means to introduce, at least, a meat piece, after sustaining above treatments, inside a first station for surface sterilization, the first station including a chamber that can be tightly closed;

means for taking, holding in a stable position inside the first station, and releasing the meat piece;

means for tight sealing of the chamber of the first station, once the meat piece has been introduced therein, and for opening the chamber after a pre-set time required for a meat piece surface sterilization;

means for providing heat inside the enclosure of the first station, in position of tight sealing, until the internal atmosphere reaches an average temperature ranging from 100 to 160 degrees C., with an interval of treatment time below 15 seconds;

means to withdraw the sterilized meat piece from inside the station of the first treatment chamber, and to transfer the piece to a second station for the wrapping thereof where it is placed in a pre-set position;

means for sequentially positioning tubular containers such as bags, from a storage area thereof, up to a position in the second station in which its inlet remains adjacent and facing the meat piece position in the second station;

means for opening the inlet of the tubular container and keeping it open, and fixing, at least two walls of the bag;

means to transfer by pushing the meat pieces inside the containers with their inlets open;

means to grip the filled containers, with their inlets still open and to move them, in the attained conditions to a third station for vacuum sealing thereof;

the three stations and the entire means remaining located except the meat piece entering means to the first station, inside a wrapping enclosure provided with an ultrafiltrate air impulsion module, constituting a laminar upright flow chamber, to guaranty the asepsis of the atmosphere in which the operations are carried out, and the means being synchronized for a sequential cyclic performance of the operations in the different stations;

BRIEF DESCRIPTION OF THE DRAWINGS

The above and other objects, advantages and features of the present invention will become more apparent from the following description of certain preferred embodiments thereof with reference to the accompanying drawings wherein:

FIG. 6 is a top plan view of the means to hold the meat piece inside the chamber of the first station and the means to withdraw the meat piece; and FIG. 6A shows a detail of the supporting floor for the meat piece to withdraw it from the first station;

FIGS. 11 and 12 are side elevational views of the machine unit taken according to the direction of the allows A and B of FIG. 3, respectively;

FIG. 13 is an elevational view taken according to the direction of the arrow C of FIG. 3;

DETAILED DESCRIPTION

Figure 1:
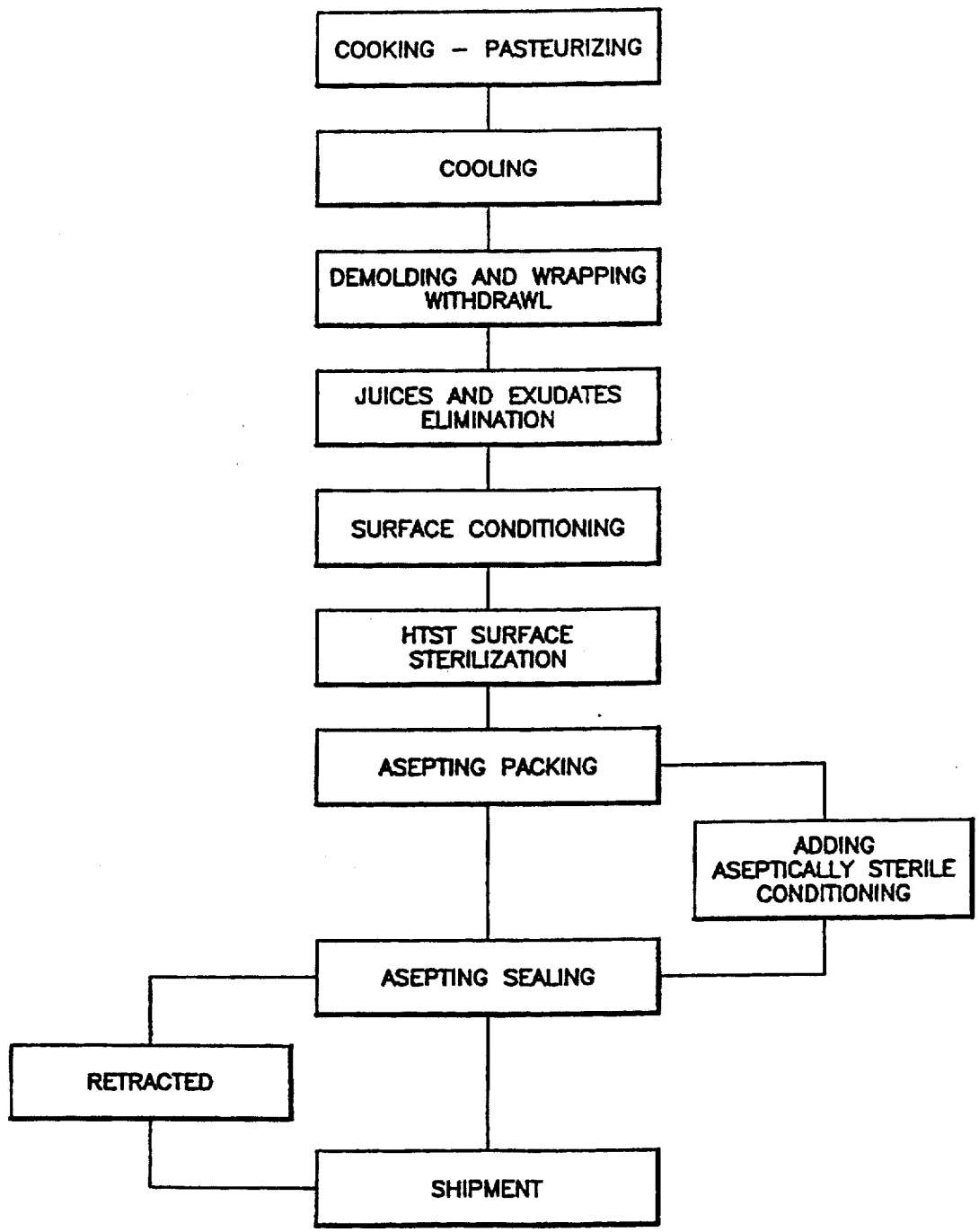
FIG. 1 is an explanatory diagram of the different operational procedures in accordance with the invention.
Figure 2:
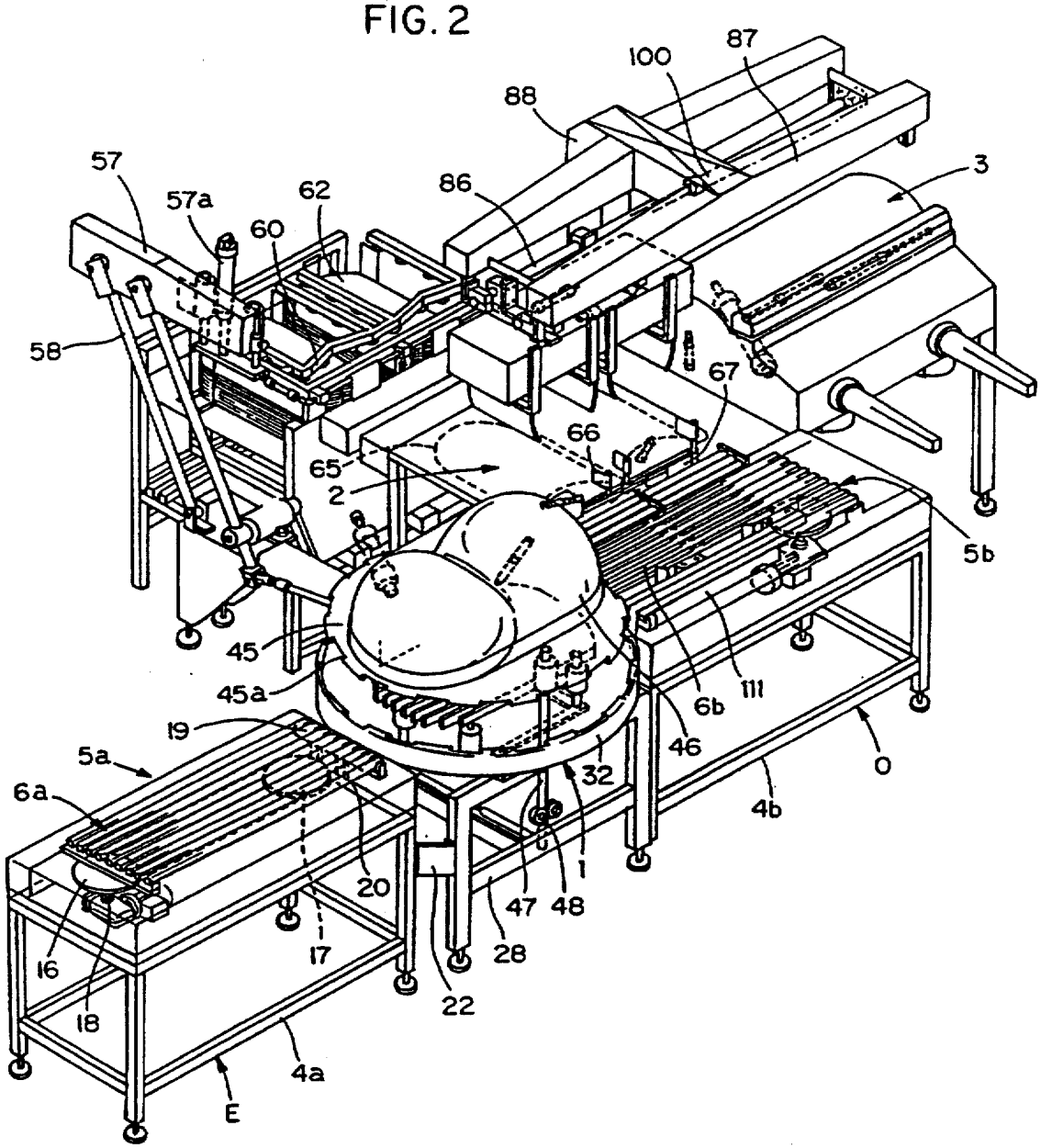
FIG. 2 is a general perspective view of a machine used for carrying out the process without its upright laminar flow wrapping cabin, showing the three operation stations composing it.

Referring to above figures, and namely FIG. 2, the machine used for carrying out the process of the invention comprises essentially three stations: sterilizing station 1, a bag filling station 2, and a sealing station 3 for the bags including a meat piece.

At both sides of the first station 1 there exists units to enter the meat piece inside the station, and for withdrawing it, respectively, generally designated with the letters E and O, which essentially comprise frames 4a, 4b and a movable supporting floor 5a, 5b formed by a plurality of strips 6a, 6b linked to a conveying truck constituted by a transversal joist 7, side plates 8 supporting wheels 9 which surround horizontal guides 10, fixed to frames 4a and 4b, respectively. Said joist 7 has an inverted U shaped cross-section, and inside such U wheels 11 are arranged, linked to a T-shaped support 12 which is fixed by one of its ends by a C-shaped part 13 to a link 14 of a chain 15, which extends between two coplanar toothed wheels 16 and 17, one of them driven and the other controlled by a motoreducer 18. Each strip set 6 remains locked, by one of its ends, to respective joist 7 and is supported, by its other end on a support 19 fixed by a strut 20 to the frame 4a, 4b, said support including guides 21.

Said sets E and O remain linked to the central station by rigid locking plates 22 in order to guaranty a suitable aligning of the strips to allow them to interpenetrate with respect to a grid 23 of strips installed inside the chamber of station 1.

The set O, has as single difference from set E that enters the meat piece, in that, as shown in FIG. 6 and detail 6A, the strips 6b have offset areas 24 to lodge cylinders 25 ending in shafts 26 which are socketed in end notches 27 of each offset, allowing its free rotation, so forming a rotatable floor.

Figure 10:
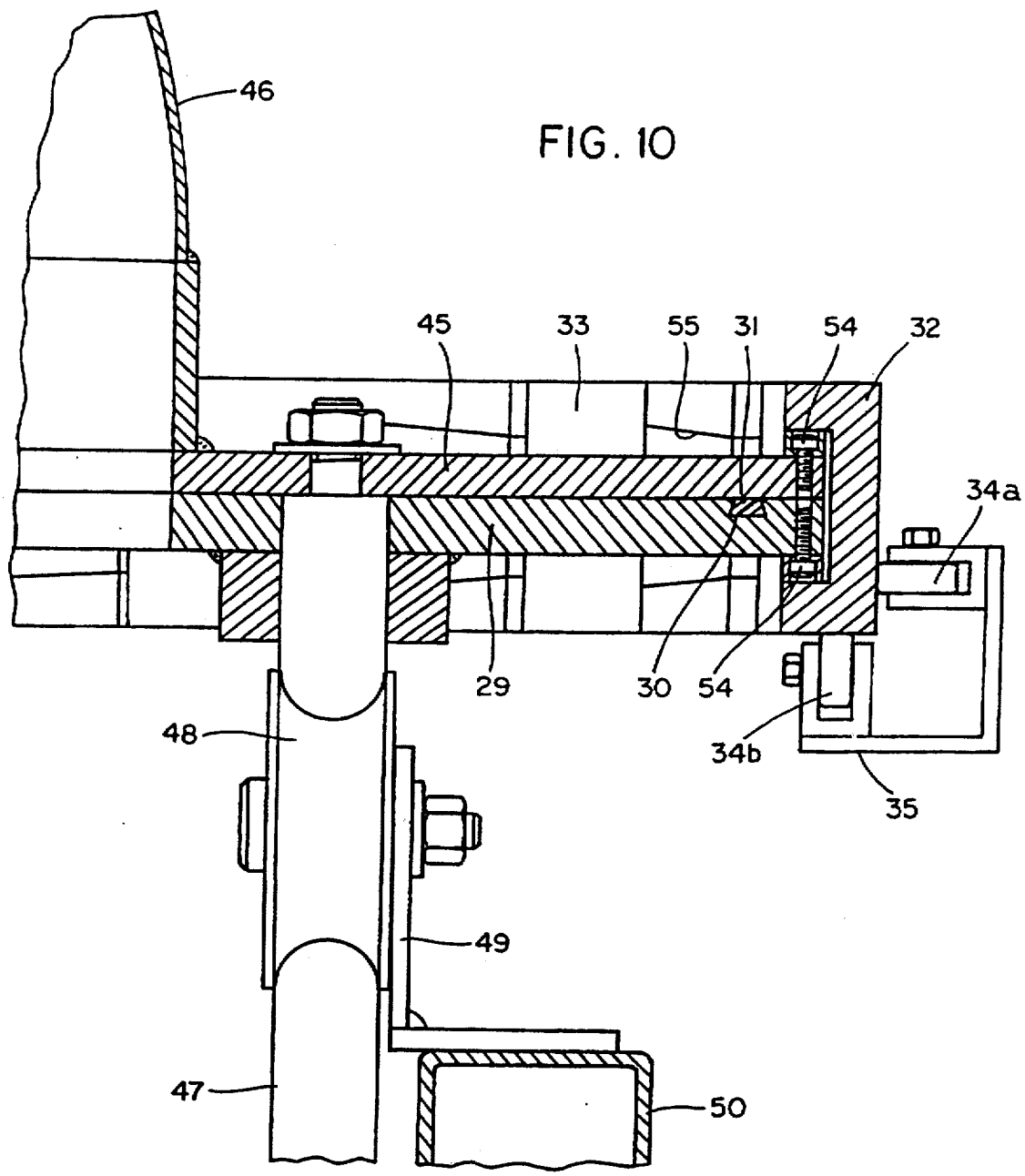
FIG. 10 is a detail in larger scale of part of FIG. 9 showing, the means to rotatable support the surrounding ring as well as the tight closing means between the bottom disc and the plate holding the cover.
Figure 10A:
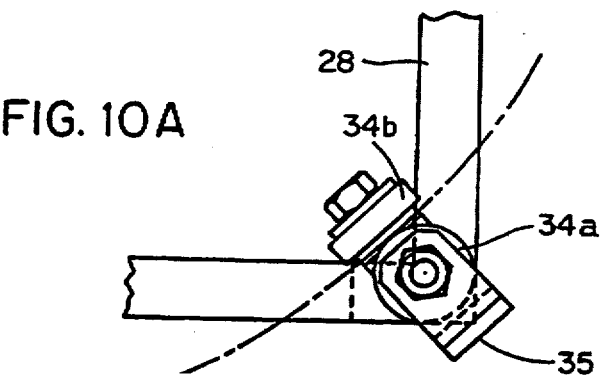
FIG. 10A is a top plan view of the revolving means used to support and guide the surrounding ring.
Figure 12:
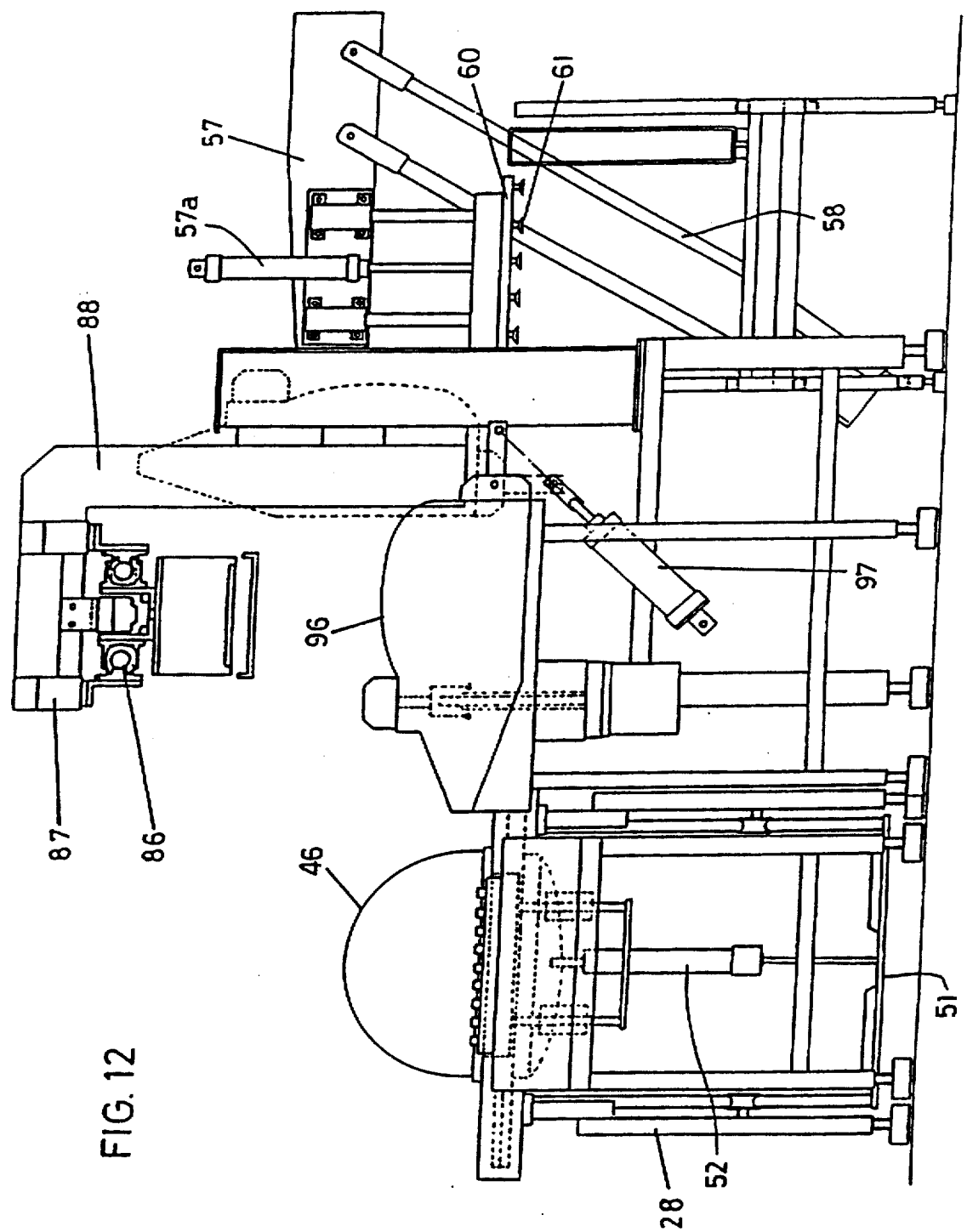
Figure 15:
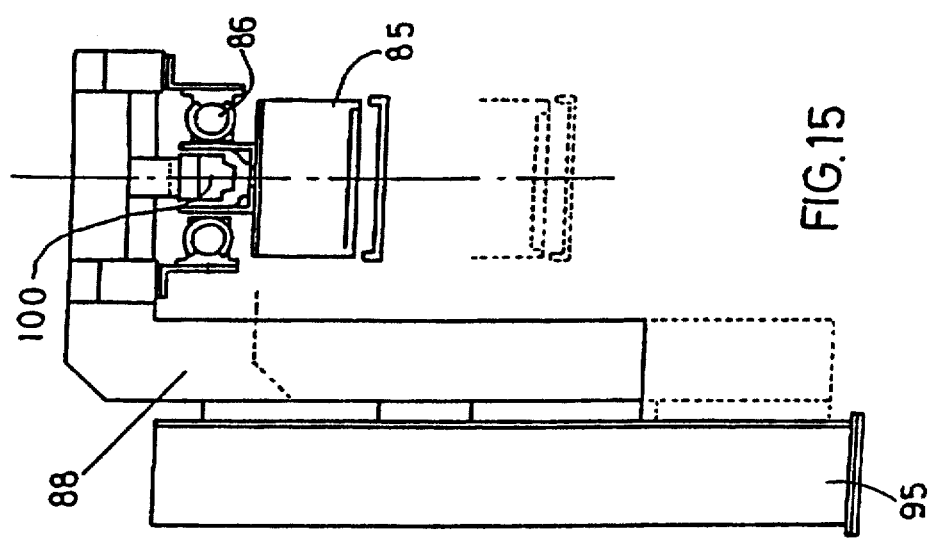
FIG. 15 is a left side view of FIG. 14.
Figure 14:
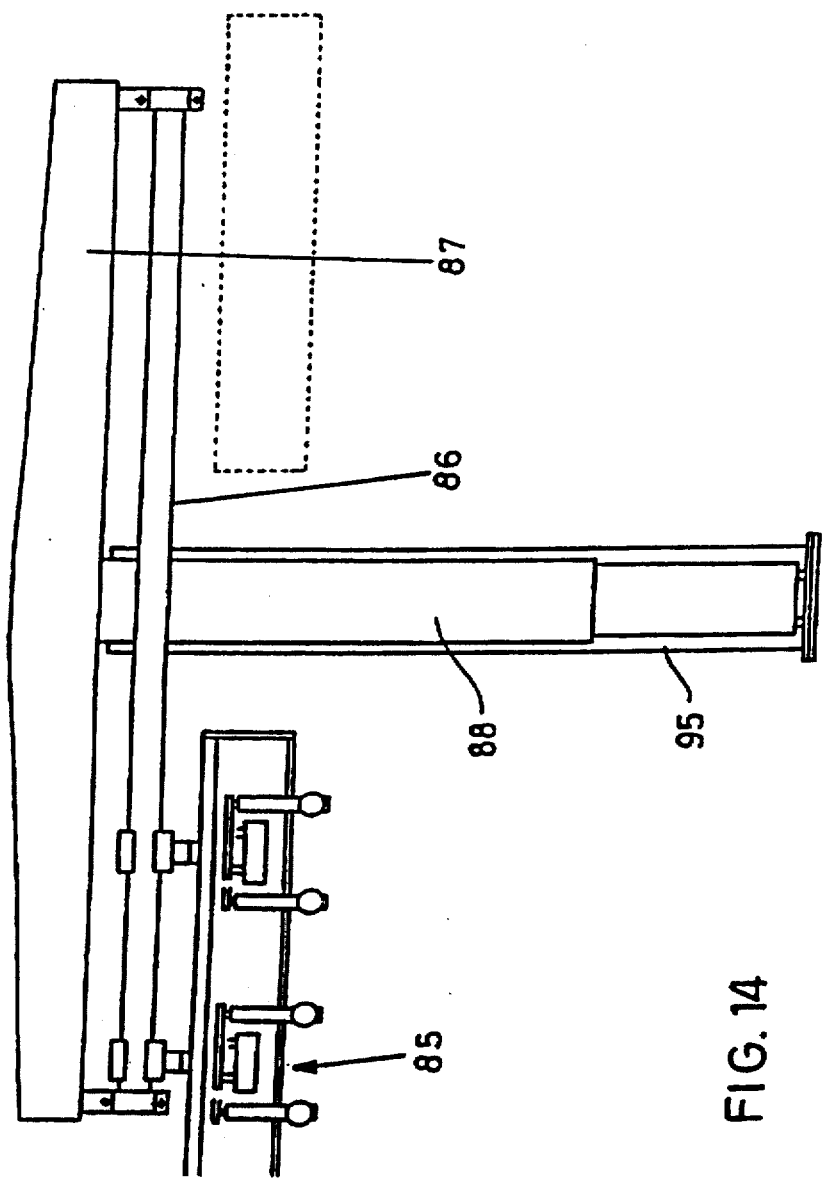
FIG. 14 is an elevational view showing the means to grip the containers with the meat piece from the first station to transfer to the third station.

First station 1 comprises a bedframe 28 on which is defined a receptacle including a fixed disc 29 as the bottom, with a basin 29a on its periphery and a circumferential groove 30 close to its edge where a sealing gasket 31 is (see FIG. 10). The disc 29 is surrounded by a ring 32 of C-shaped section inwardly oriented, rotatably movable, whose annular ribs loosely clasp the periphery of disc 29 and having a series of equally spaced cutouts 33, equivalent to those 29b existing on disc 29, to allow its positioning, ring 32 resting (see FIGS. 10 and 10A) on a set of wheels 34a 34b, which are mounted on a support 35 integral with the bedframe 28. Ring 32 is linked to an hydraulic cylinder 36 with its body locked to the bedframe 28 and its stem linked to the ring 32 external side wall.

Figure 3:
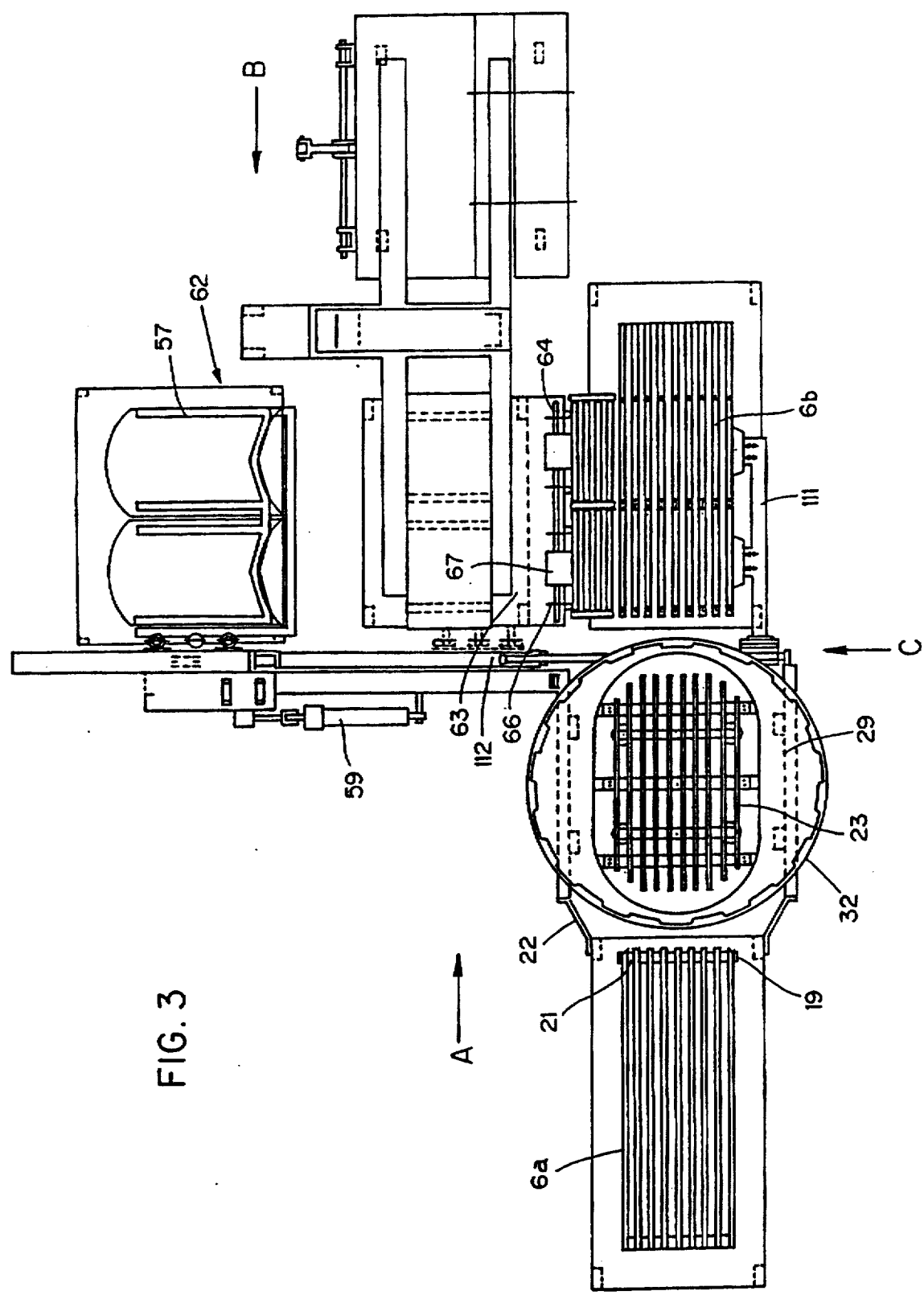
FIG. 3, is a top plan view of the machine unit of FIG. 1.
Figure 4:
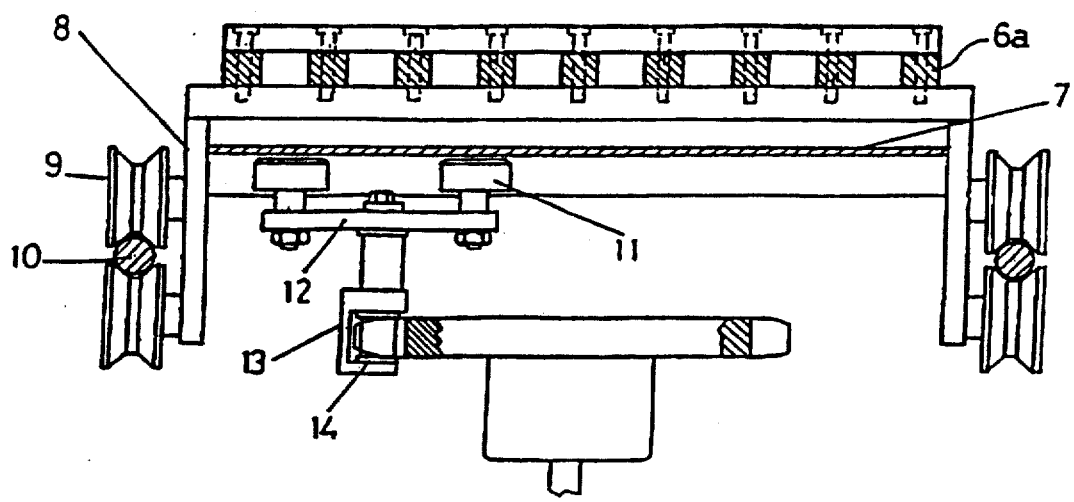
FIG. 4 is a side elevational view, partially in cross section showing the supporting floor conveying means to enter and withdraw the meat piece with respect to the first station.
Figure 5:
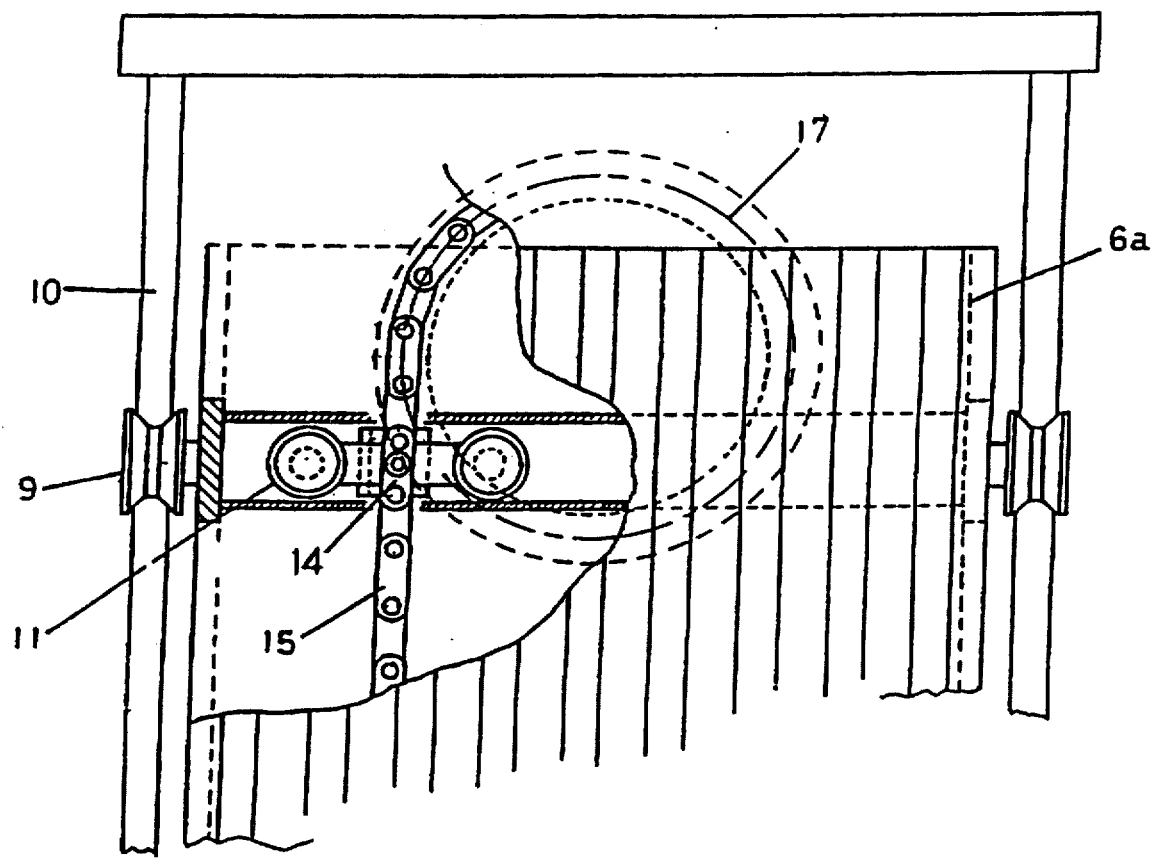
FIG. 5 is a top plan view, partially in cross section, of part of the conveying means of FIG. 4.
Figure 7:
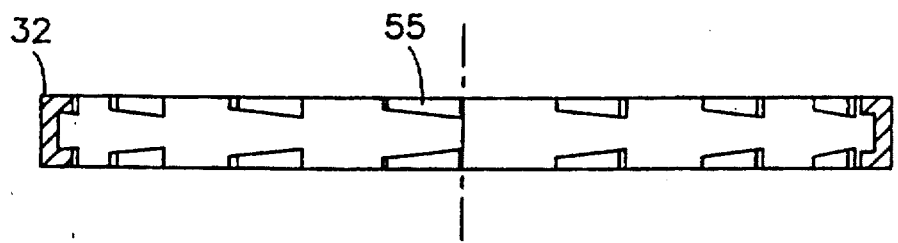
FIG. 7 is a side elevational view in cross section of the ring constituting the first station chamber side wall.
Figure 8:
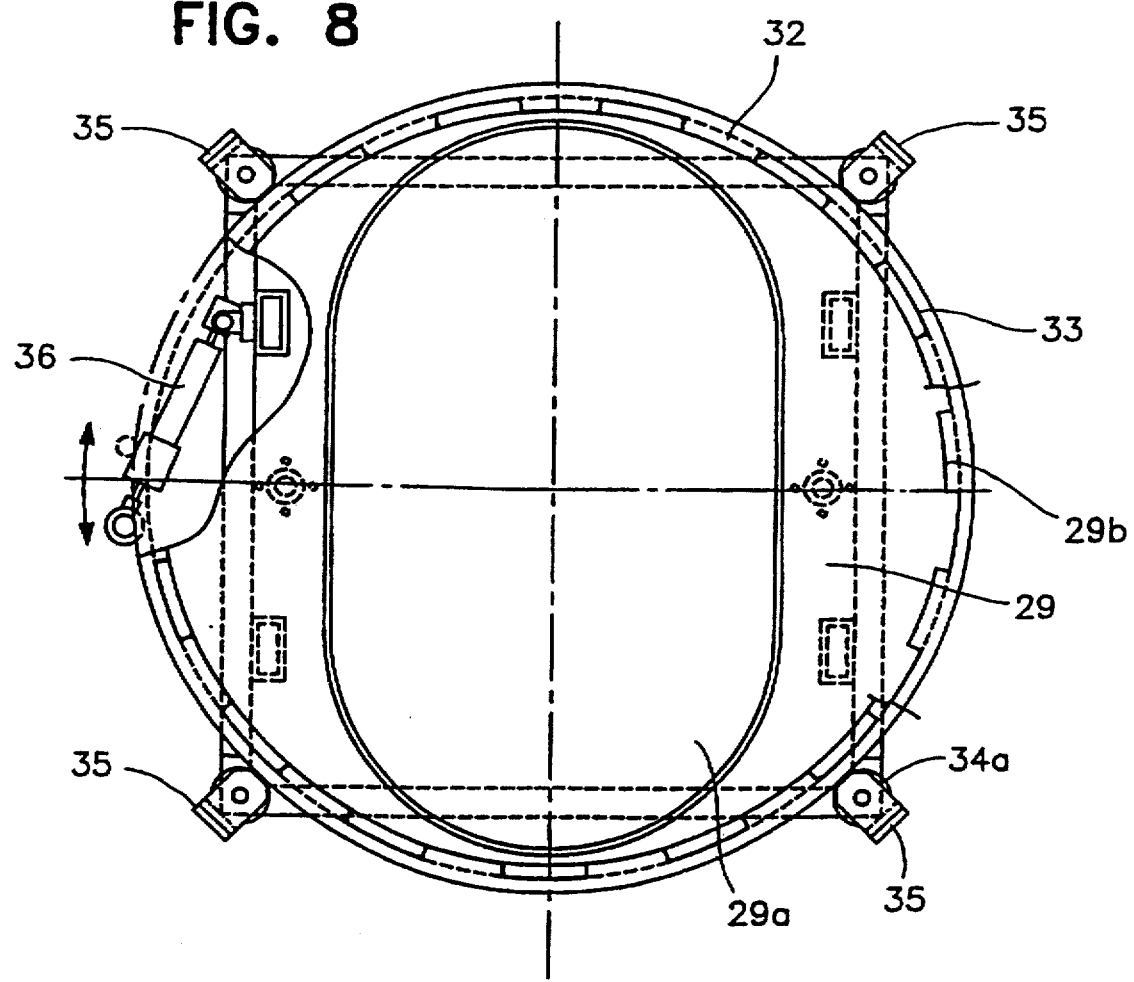
FIG. 8 is a top plan view showing the driving means for rotating the ring and one part of the periphery of the bottom disc, through a cut out of the annular flange of the rings.
Figure 9:
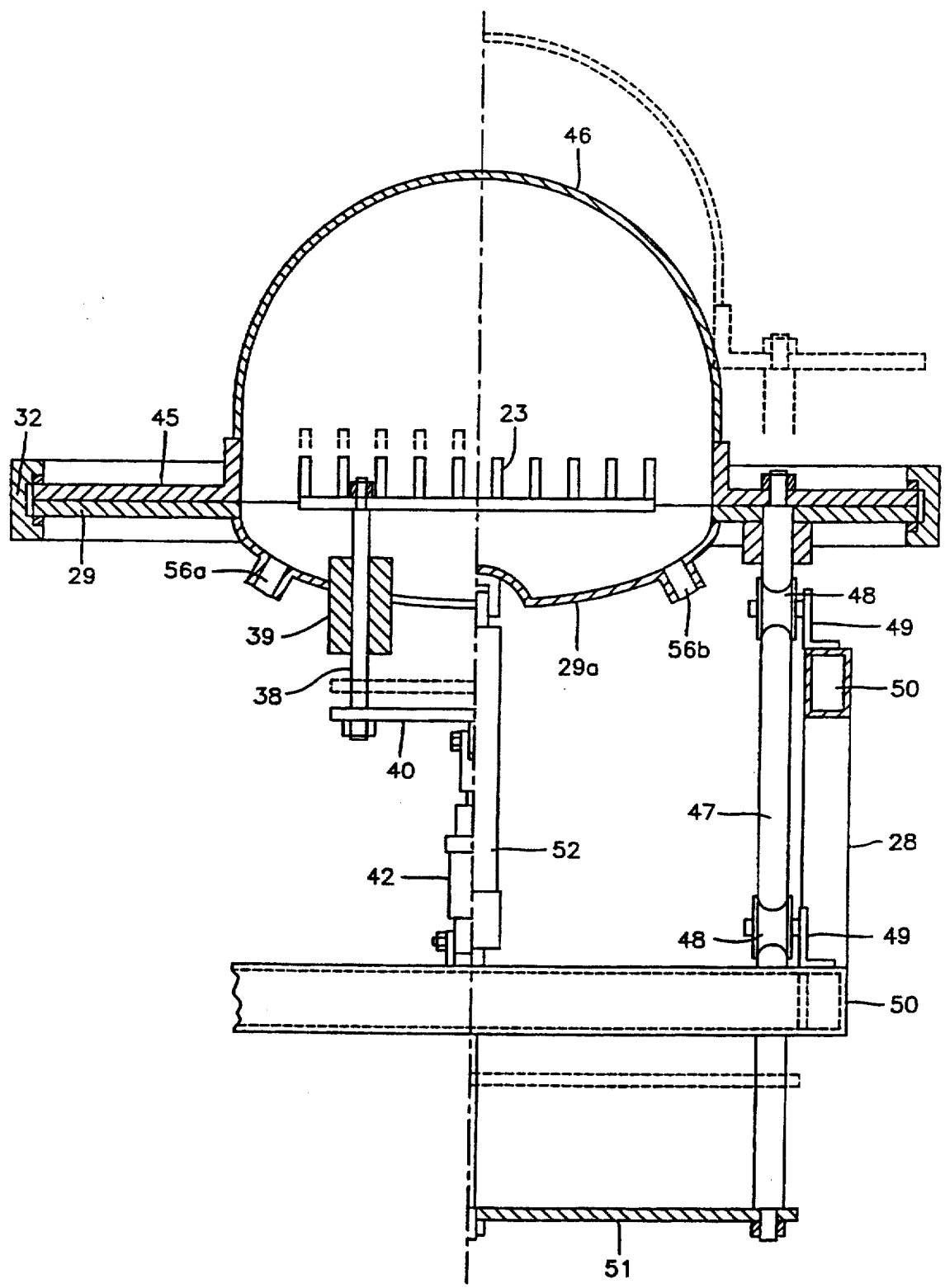
FIG. 9 is an enlarged side elevational view partially in cross section showing the means to move the meat piece supporting grid (left half side) and the chamber sealing cover (right half side) forming the first station.

Above the bottom 29 there exists a supporting floor for the meat piece, formed by a grid 23 (see FIGS. 3,6 and 8) whose bars are locked to two cross sectional profiles 37 which in turn remain linked to both pairs of stems 38 guided by sockets 39 fixed on a basin-shaped center portion 29a of the disc 29. The stems 38 are joined to each other, in pairs, by means of profiles 40 which, in turn, remain linked by a cross sectional profile 41 (see FIG. 13) forming an H which remains joined to a stem of a fluid dynamic actuator 42 with an upright stem.

Integral with the bottom 29 of the receptacle there exists three other cross sectional profiles 44 whereon are arranged U-shaped profile parts 44, of a low friction coefficient material such as Teflon, acting as guides for strips 6a and 6b of the entering and extracting floors 5a and 5b.

First station 1 comprises an upper plate 45 which is topped at its center portion by a double-dome-shaped covering part 46. The plate 45 is integral with two upright stems 47, which in turn are guided by sets of pulleys 48 mounted on supports 49 integral with joists 50 of the bedframe 28. The stems 47 are joined at their lower parts by a bar 51 which is connected to a second fluid dynamic actuator element 52.

The plate 45 has a series of peripheral cut outs 45a equivalent to cut outs 29b on the periphery of the fixed disc 29, and on the protruding ribs there is, detachably locked by their two faces, wedge-shaped in circumference segment parts 54 which correspond to wedge-shaped profiles 55 defined on the internal higher and lower faces, of the C-shaped profile of the surrounding ring 32.

On the other side, the means to provide heat inside the chamber of first station 1 comprise nozzles 56a and 56b to supply and suck high temperature and pressure vapor.

Second station 2 (see FIG. 11) comprises a tilting head 57 by means of arms 58 rotatably articulated and driven by fluid dynamic cylinder 59. Head 57 includes an overhanging plane 60 provided with a series of sucking pads 61 to grip at least two bags 65 each time, from a warehouse 62 of stacked bags 65, and for moving them onto horizontal floor 63, wherein there exists a transversal slot 64 (see FIG. 3) associated with vacuum generating means to retain a second face, opposite to the first one, of the bag 65 and blades 66 and 67 to lock the side parts and the lower edge of the bag inlet superposed on the table 63, which remains coplanar with the supporting floor 5b of the meat piece withdrawing means.

Tilting head 57 comprises a fluid dynamic actuator 57a providing a vertical displacement, in order to take the bags 65 from the warehouse, and a cylinder 98 to actuate blades 99 in order to hold the upper edge of the bag inlet.

Figure 17:
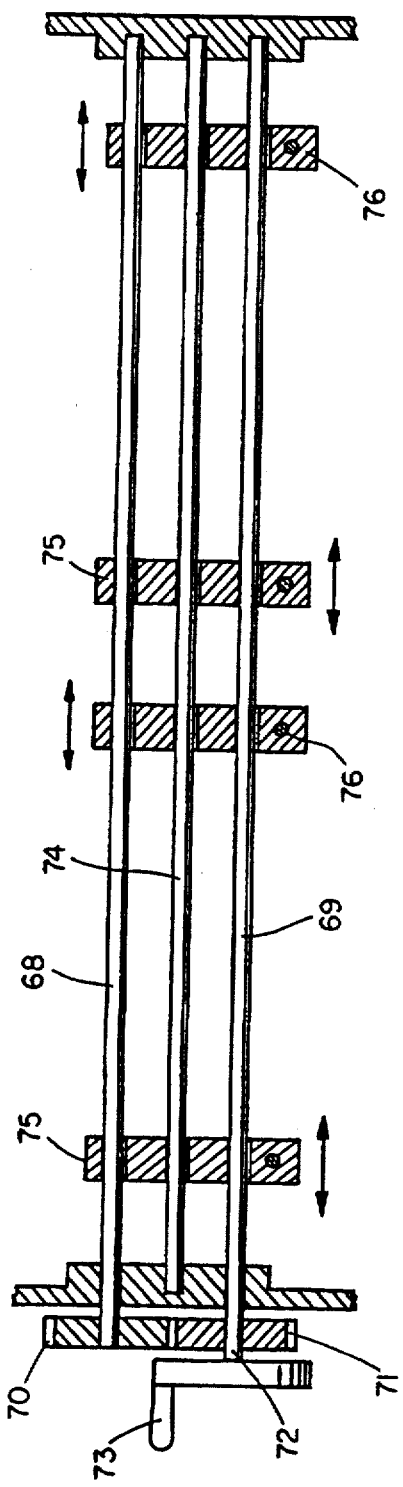
FIGS. 17 and 18 are top plan and side elevational views, respectively which show the mechanism for operating blades.
Figure 18:
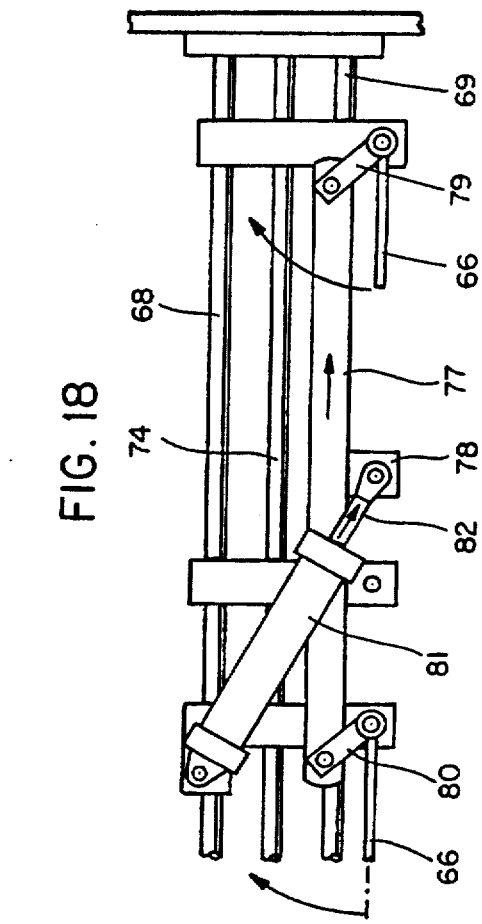

FIGS. 17 and 18 show the mechanism to drive the side blades 66 which includes a set of two spindles 68 and 69 each of them ending in toothed wheels 70, 71 geared to each other and one of them holding a shaft 72 with a driving crank 73 Associated with the spindles and guided by an intermediate guide 74, parallel to the spindles, are arranged pairs of sliding supports, 75 and 76, with holes threaded to one of the spindles and merely slidably engaging the other spindle, related two by two with bars 77 housed in rotating levers 79, 80 mounted on sliding supports 75, 76. The stem 82 of a fluid dynamic cylinder 81 is articulated to a lug 78 of bars 77 and said cylinder is integral with one of the sliding supports, in such a way that when cylinder 81 acts, a coordinated rotation of the levers 79, 80 and through it of the lateral blades 66 occurs. The mechanism of the spindle allows to suitably position the side parts depending on the width of the bag. The sliding supports 75 hold the blades of one of the sides of the two bags and the supports 76 the two blades of the other side.

Figure 19:
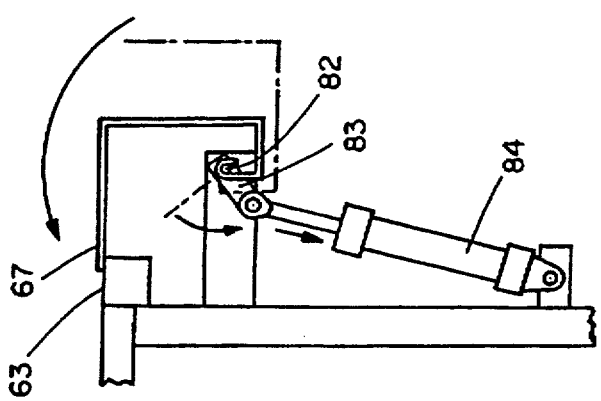
FIG. 19, is an elevational view of the corresponding mechanism related to central blades to keep the bag open, clamping its inlet edges when placed on the second station in order to facilitate the related meat piece entering inside thereof.

FIG. 19 shows the means to drive the blades 67 designed to hold the bag lower edge which consist of L-shaped plates locked by one of their ends to a shaft 82 which is rotated by a lever 83 connected to a pneumatic cylinder 84 whereby one of the L-shaped plates of blade 67 can be superposed, after a 90-degree rotation, on floor 63.

In order to transfer the meat pieces from second supporting floor 5b onto the floor 63, pushing means are employed consisting of L-shaped profile 111 with one of its arms parallel and superimposed to the strips 6b and rotatable cylinders 25, and the second arm linked to the stem of a fluid dynamic actuator 112.

Figure 16:
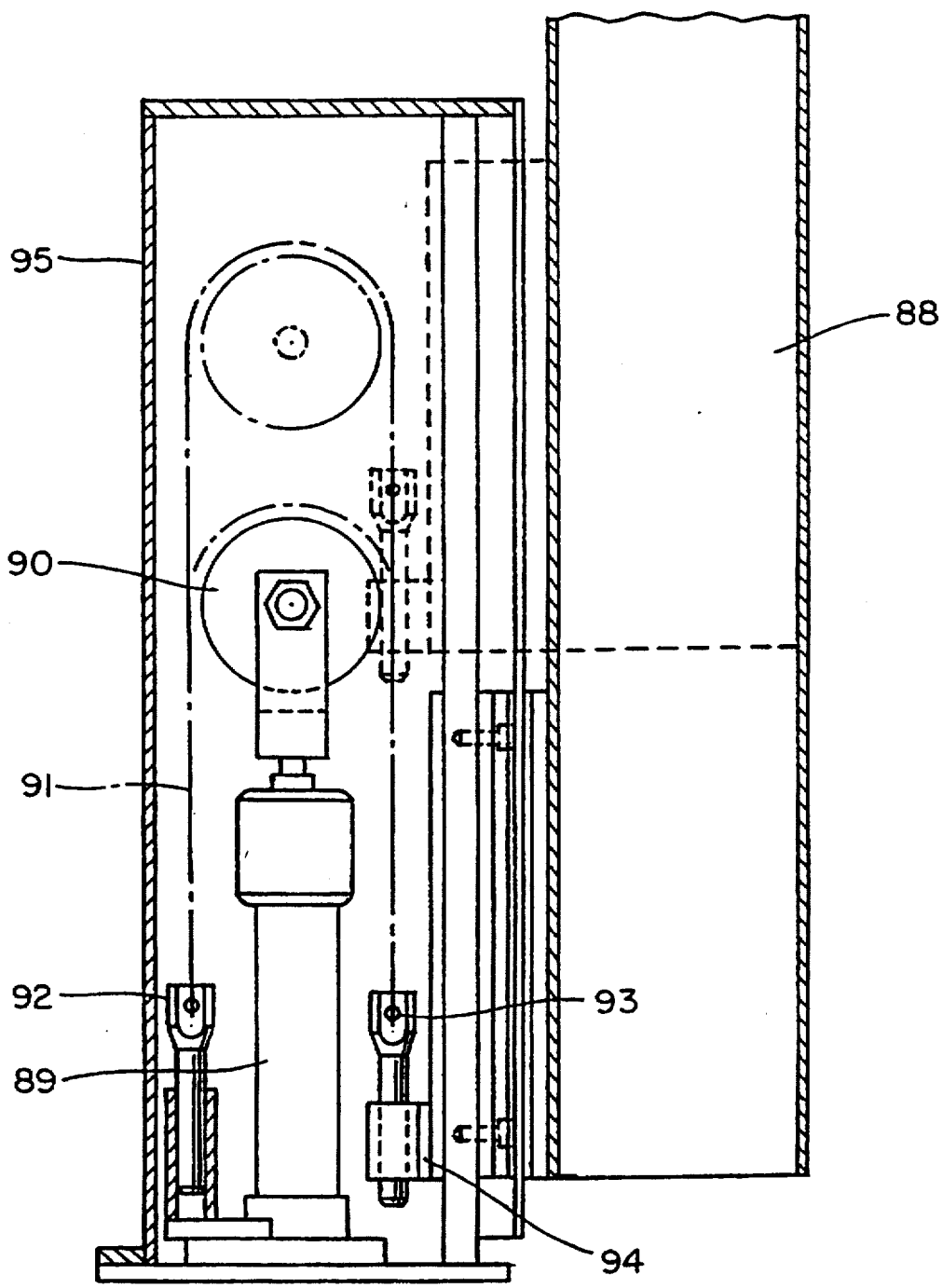
FIG. 16 is a cross-sectional view of part of FIG. 15 showing the means for lifting the unit of FIGS. 14 and 15.

The means for moving the wrapped pieces up to the third station 3 comprise clamps 85 mounted for lengthwise displacement along guides 86 of a horizontal overhanging arm 87 associated with a column 88 and means for lifting and lowering column 88 as shown in FIG. 16.

The lifting means (FIG. 16) comprise an upright hydraulic cylinder 89 having mounted at the end of the stem thereof a pulley 90 around which a chain 91 extends, locked by one of its ends to a fixed point 92 and connected by its other end 93 to a support 94 uprightly guided inside a static upright support 95.

The lengthwise movement of the clamps 85 along the arm 86 is carried out by a fluid dynamic cylinder 100 connected to clamp 85.

The containers sealing station 3 is of a conventional type and it is only emphasized that when the bag linearly moves with the product, when leaving the bags in the recess, provided with a cover 96 moved by a cylinder 97, the bags are always left in a pre-set position to make the sealing means operative.

FIG. 13 shows the cabin or enclosure 120 of upright laminar flow which surrounds the set of the three mentioned stations to guaranty that all the operations that are carried out sequentially, are achieved in a sterile atmosphere.

Figure 20:
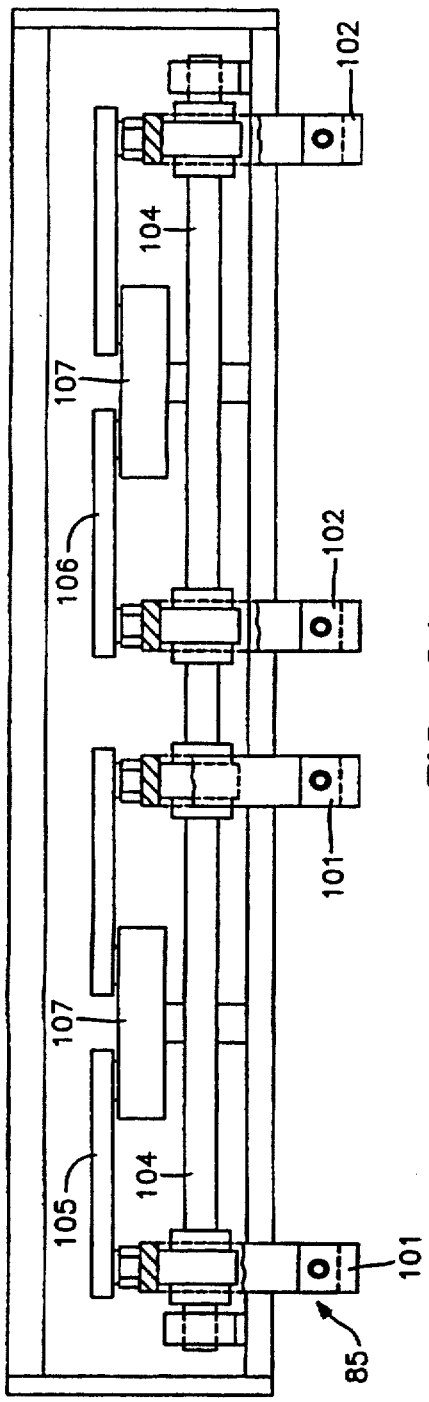
FIG. 20 is an elevational view of the mechanism for driving the clamps to grip the bags with the meat pieces to transfer them from the second station to the third station.
Figure 21:
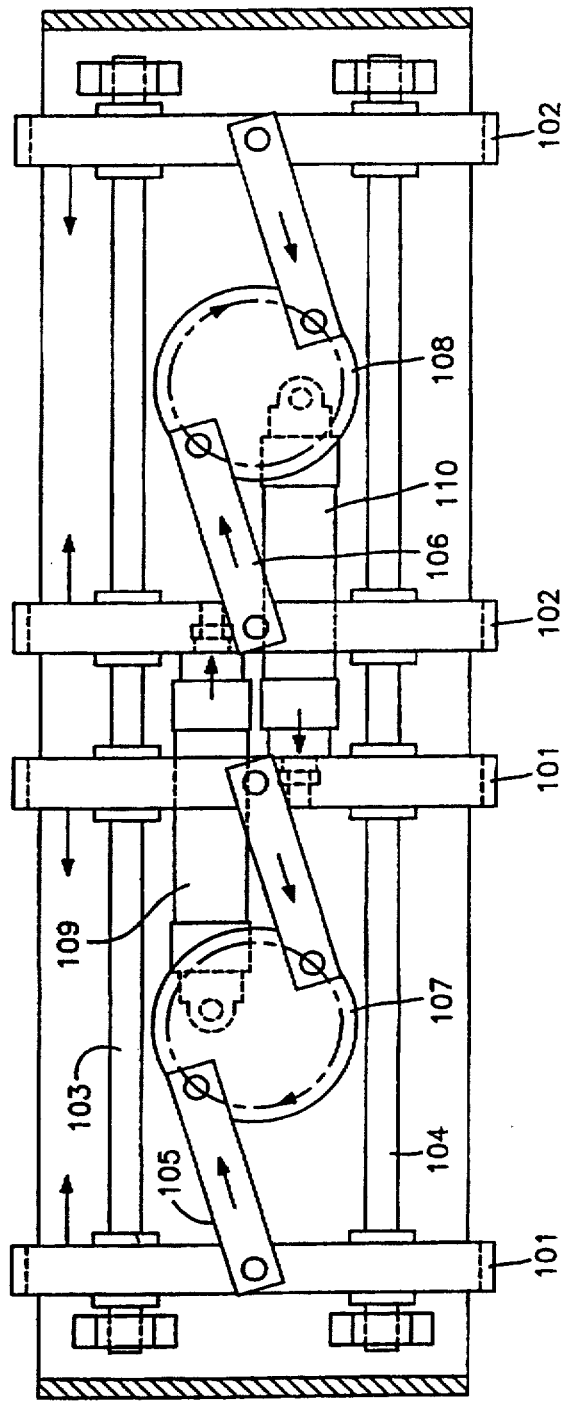
FIG. 21 is a bottom plan view of FIG. 20

Lastly FIGS. 20 and 21 describe the mechanism to actuate the clamps 85 comprising pairs of slidable support pieces 101, 102, which are moveable lengthwise along guide rods 103, 104 and connected through levers 105, 106 to diametrically opposed points of two rotatable discs 107, 108. One of the members of each pair of support pieces is attached to the stem of a fluid dynamic cylinder 109, 110 integral with a housing of the unit. As indicated by the arrows in FIG. 21, when one of the slidable support, pieces is pushed the other support piece is also moved so that they move toward or away from each other, to open or close the clamps 85.

The fluid dynamic actuators employed can be hydraulic or pneumatic depending on performances or the features of the plant.

I claim:

1. A process for treating meat products which have been deboned, injected with additives, tenderized and cured, comprising:

wrapping said meat products in a protective wrapper;

pasteurizing said meat products by cooking said wrapped meat products in a container, heating said container until the temperature in the thermal center of said meat products is in the range of 65° C. to 75° C. for a period sufficient for suitably pasteurization of the meat products which guarantees heating effects (value F 10°-70° C.) over 30 measured at the thermal center of the meat products;

removing said pasteurized meat products from said wrapping;

removing fluids exuded by said pasteurization;

conditioning the external surface of said meat products;

transferring said pasteurized meat products to a first station;

sterilizing the outer surface layer of said meat products at said first station by submitting said meat products to a thermal shock of high temperature for a very short interval using a high temperature short time (HTST) technique in an atmosphere in direct contact with said surface layer of said meat products at a temperature over 100° C. and for a time less than 15 seconds;

transferring said sterilized meat products from said first station to a second station;

wrapping said sterilized meat products at said second station in aseptic conditions in containers having open inlets;

transferring said containers containing said meat products with said inlets remaining open from said second station to a third station in aseptic conditions; and sealing said containers containing said sterilized meat products at said third station in aseptic conditions so that organoleptic and nutritious conditions of said meat products is not impaired.

2. The process as claimed in claim 1 and further comprising:

providing a sterilizing chamber in said first station;

placing said meat products in said sterilizing chamber;

sealing said sterilizing chamber; and heating the inside of said sterilizing chamber when sealed for producing an atmosphere reaching an average temperature in the range from 100° C. to 160° C. and for a time less than 15 seconds to produce said surface sterilization of said meat products.

3. The process as claimed in claim 2 wherein:

said containers for wrapping said sterilized meat products at said second station are tubular containers; and further comprise maintaining said inlets of said tubular containers open by retaining at least two walls of each tubular container in fixed positions.

4. The process as claimed in claim 3 wherein:

said sealing at said third station comprises vacuum sealing said inlets of said containers.

5. The process as claimed in claim 4 and further comprising:

enclosing said first, second and third stations in an enclosure; and producing a laminar upward flow in said enclosure to provide a microorganism free atmosphere at said stations.

6. The process as claimed in claim 5 and further comprising:

synchronizing said steps of said process for sequencing cyclic operation thereof.

7. The process as claimed in claim 1 wherein:

said containers for wrapping said sterilized meat products at said second station are tubular containers; and further comprising maintaining said inlets of said tubular containers open by retaining at least two walls of each tubular container in fixed positions.

8. The process as claimed in claim 1 wherein:

said sealing at said third station comprises vacuum sealing said inlets of said containers.

9. The process as claimed in claim 1 and further comprising:
enclosing said first, second and third stations in an enclosure; and
producing a laminar upward flow in said enclosure to provide a microorganism free atmosphere at said stations.

10. The process as claimed in claim 1 and further comprising:
synchronizing said steps of said process for sequencing cyclic operation thereof.

* * * * *